(12) United States Patent
Rombach et al.

(10) Patent No.: US 7,798,018 B2
(45) Date of Patent: Sep. 21, 2010

(54) MEASURING ARRANGEMENT FOR FLOW MEASUREMENT IN A CHANNEL

(75) Inventors: Martin Rombach, Lenzkirch (DE); Udo Hug, Villingen-Schwenningen (DE); Manfred Streicher, Lenzkirch (DE); Jürgen Hall, Rötenbach (DE)

(73) Assignee: Testo AG, Lenzkirch (DE)

( * ) Notice: Subject to any disclaimer, the term of this patent is extended or adjusted under 35 U.S.C. 154(b) by 0 days.

(21) Appl. No.: 12/309,377

(22) PCT Filed: Jun. 8, 2007

(86) PCT No.: PCT/EP2007/005082

§ 371 (c)(1),
(2), (4) Date: Sep. 21, 2009

(87) PCT Pub. No.: WO2008/009333

PCT Pub. Date: Jan. 24, 2008

(65) Prior Publication Data

US 2010/0043567 A1 Feb. 25, 2010

(30) Foreign Application Priority Data

Jul. 18, 2006 (DE) .................. 20 2006 011 065 U (51) Int. Cl.
*G01F 1/46* (2006.01)
(52) U.S. Cl. .................................. 73/861.65
(58) Field of Classification Search ............. 73/861.65, 73/182; 701/7; 702/50; 374/143
See application file for complete search history.

(56) References Cited

U.S. PATENT DOCUMENTS

| 2,352,607 | A |   | 7/1944  | Alperin |
|---|---|---|---|---|
| 3,581,565 | A |   | 6/1971  | Dietrich |
| 3,978,728 | A | * | 9/1976  | Cutler ...................... 73/861.65 |
| 4,546,655 | A |   | 10/1985 | Victor |
| 6,883,389 | B2 | * | 4/2005  | Eldridge ................... 73/861.65 |
| 7,480,548 | B2 | * | 1/2009  | Shigemi et al. ................. 701/7 |
| 7,654,157 | B2 | * | 2/2010  | Speldrich ................. 73/861.65 |

FOREIGN PATENT DOCUMENTS

| DE | 1 935 989   |    | 1/1970 |
|----|-------------|----|--------|
| EP | 0 137 623   | A1 | 4/1985 |

* cited by examiner

*Primary Examiner*—Jewel Thompson
(74) *Attorney, Agent, or Firm*—Muirhead and Saturnelli, LLC (57) ABSTRACT

A measuring arrangement for determining flow speeds in a flow channel includes a probe tube which is introduced via a first opening into the flow channel. The probe tube is exposed to a flow with a flow speed, the side of the probe tube facing the flow comprising a plurality of openings which are interconnected inside the probe tube such that a total pressure dependent on the flow speed prevails inside the probe tube. The measuring arrangement also comprises a static pressure opening in the flow channel, and a differential pressure sensor that determines the differential pressure between the total pressure inside the probe and the static pressure in the flow channel. The probe tube may be partially surrounded by a shield which is mobile and/or length-adjustable and that, according to its position and/or length along the probe tube, may close one, several or none of the openings.

20 Claims, 6 Drawing Sheets

MEASURING ARRANGEMENT FOR FLOW MEASUREMENT IN A CHANNEL

TECHNICAL FIELD

This application relates to an arrangement for measuring flow velocities and volume flows in a flow channel with the help of a Pitot tube.

BACKGROUND OF THE INVENTION

Pitot tubes, also known as dynamic pressure gauges, are widely used sensors in flow meter technology for determining flow velocities. A special form of a Pitot tube is the Prandtl tube, for example, which is used for speed measurement in aviation. However, dynamic pressure gauges are used in ventilation technology in measuring flow velocities, volume flows, or mass flows in ventilation ducts because they are characterized by the possibility of simple assembly and by a low pressure drop in the installed state.

Figure 1:
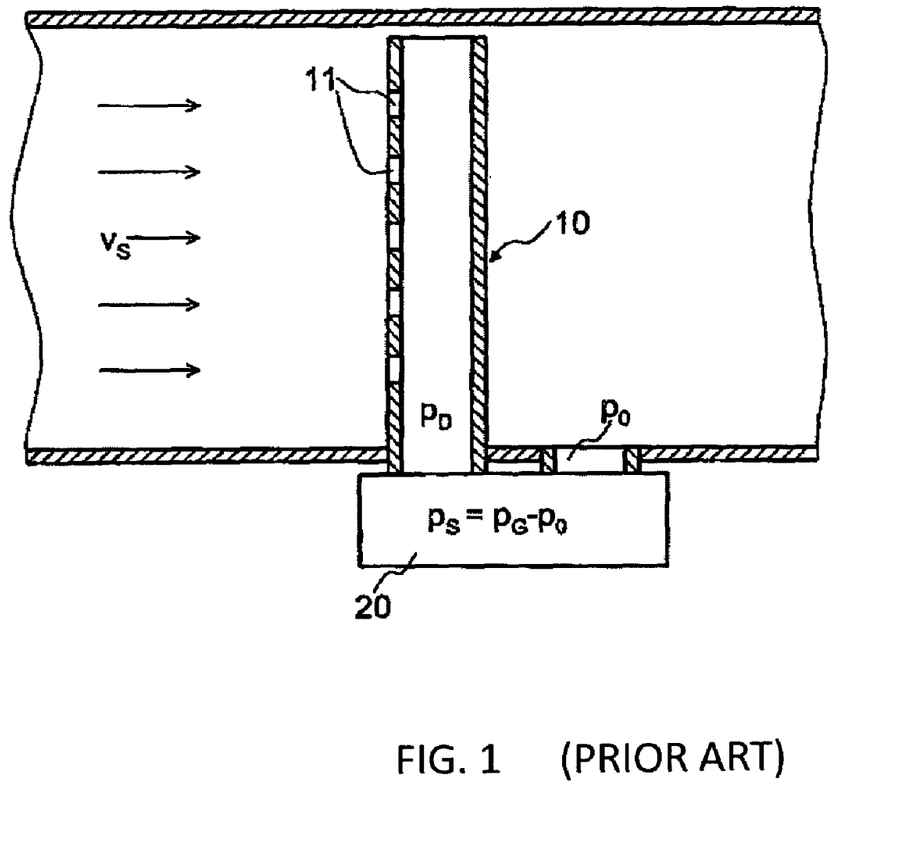
FIG. 1 shows a measuring arrangement having a Pitot tube according to the related art.

A known design of such dynamic pressure gauges is illustrated in FIG. 1, for example. A probe tube 10 is inserted through an opening into the interior of a flow channel 1. Openings 11 are provided along an axis of probe tube 10 on the side of probe tube 10 facing the flow, so that a total pressure $p_G$ dependent on flow velocity $v_S$ prevails in the interior of the probe tube. The interior of probe tube 10 is connected to a first connection of a differential pressure sensor 20. A second connection of differential pressure sensor 20 is connected to another opening in the flow channel through which oncoming flow does not pass directly. The second connection of differential pressure sensor 20 is thus at a pressure level corresponding to static pressure $p_0$ in the interior of the flow channel. Pressure difference $p_S = p_G - p_0$ is known as the stagnation pressure or dynamic pressure. Flow velocity $v_S$ is calculated easily from dynamic pressure $p_S$ as follows:

$$v_s = \sqrt{\frac{2 \cdot p_s}{\rho}} \quad (1)$$

Symbol $\rho$ here denotes the density of the flowing medium. The relationship above follows directly from the Bernoulli equation.

Flow velocity $v_S$ is normally not constant over the cross section of the flow channel. An average dynamic pressure $p_S$ and from this an average flow velocity $v_S$ in flow channel 10 are ascertained because probe tube 10 has multiple openings 11 along its longitudinal axis. Such a measurement of the average flow velocity is too inaccurate, however, and the particular flow profile must be included in the measurement result. In the past, this problem has been solved by adjusting and calibrating Pitot tubes individually for each possible channel cross section. This is only a minor problem with permanently installed Pitot tubes, but for mobile measurements using portable operational control meters, a probe tube adapted to each possible channel cross section would be necessary, which is not practical for mobile applications. An enormous number of different probes, namely one for each possible channel cross section, would be necessary.

Accordingly, it would be desirable to provide a measuring arrangement for determining the flow velocity in a flow channel which is suitable for performing sufficiently accurate measurements of flow velocity in tubes of any diameter.

SUMMARY OF THE INVENTION

Unlike the related art, in the system described herein the problem of the influence of the flow profile over the cross section of the flow channel on the measurement result for the average flow velocity is solved not by adapting and calibrating a Pitot tube specifically for a certain channel cross section but instead by improving upon the Pitot tube to the extent that a measurement of the flow profile is possible and thus the measurement result for the flow profile may also influence the calculation of the average flow velocity.

According to the system described herein, a measuring arrangement for determining flow velocities in a flow channel includes, in addition to the flow channel, a probe tube having multiple openings situated along a line parallel to a longitudinal axis of the probe tube and a differential pressure sensor. The probe tube is inserted through a first opening into the interior of the flow channel in such a way that the openings in the probe tube are facing the flow in the flow channel. All the openings facing the flow lead into the interior of the probe tube, where a total pressure (static pressure+dynamic pressure) prevails as a function of the oncoming flow velocity.

The differential pressure sensor has a first connection, which is connected to the interior of the probe tube. A second connection of the differential pressure sensor is connected to the flow channel via an opening in such a way that the static pressure in the interior of the flow channel is applied to that second connection. Therefore, this opening must not be exposed to the oncoming flow in the channel and must be situated with its cross section parallel to the flow lines. The differential pressure measured by the differential pressure sensor corresponds exactly to the dynamic pressure in the interior of the probe.

The probe tube is also at least partially surrounded by a displaceable and/or length-variable shield that is designed to close or cover one or more openings or none at all, depending on the position and/or length of the shield along the probe tube.

After insertion of the probe into the flow channel, it is possible to measure not only an average dynamic pressure value but also an entire measurement series with as many individual pressure measurements as there are openings in the probe tube. Each measurement of the measurement series is performed with a different number of openings exposed to oncoming flow. The openings that should not be exposed to oncoming flow must be covered by the shield. The probe may be inserted only partially into the flow channel during a measurement. The shield is positioned in such a way that the openings that are not in the flow channel are covered by the shield and the openings that are in the channel are exposed to oncoming flow. In this case, the shield is thus only outside of the channel. However, the probe may also be inserted completely into the channel. In this case, the shield must of course be positioned at least partially in the channel to cover a different number of openings there, depending on the length and position of the shield.

In the first differential pressure measurement of the measurement series, only a first opening in the probe tube is not closed and may be freely exposed to oncoming flow. Prior to the second differential pressure measurement, a second opening in the probe tube (for example, an opening directly adjacent to the first opening that is already open) is exposed, so that in the second measurement, two openings (for example, adjacent openings) are exposed to oncoming flow and the average dynamic pressure in the interior of the probe tube changes accordingly. Prior to each additional measurement, another opening in the probe tube, which was previously closed by the shield, is exposed (for example, the opening directly adjacent to the opening that was exposed immediately previously). This procedure is continued until all the openings in the probe tube are uncovered and are freely exposed to oncoming flow. This procedure may of course be performed equally well in the opposite order, i.e., all the openings in the probe tube are exposed to oncoming flow in the first measurement and one opening after the other is successively covered by the shield in subsequent measurements until only one opening is freely exposed to oncoming flow and contributes to the average pressure in the probe tube. The order in which the openings are covered or exposed is not relevant for the result. However, for practical reasons, the openings are usually covered or exposed in a given order.

The change in the average dynamic pressure in the interior of the probe tube during the successive opening or closing of the openings in the probe tube provides information about the flow profile over the cross section of the flow channel. The shape of the flow profile is ascertainable from the measured series of dynamic pressure values.

In an embodiment of the system described herein, the shield may be designed as a bellows or as a telescoping tube of variable length that is pulled over the probe tube and covers one or more neighboring openings in the probe tube or covers none at all, depending on its position and/or length, so that they are no longer exposed to oncoming flow. Another option is to use a second tube that is also pulled over the probe tube and which has openings that overlap with the openings in the probe tube, depending on the position of the shield, and these openings may be exposed or closed, depending on the position. In this case, a rail which is situated on the side of the probe tube facing the flow may also be used instead of a tube.

To be usable as a universal parameter probe, moisture and temperature sensors may also be provided on the probe tube in the measuring arrangement according to the system described herein.

BRIEF DESCRIPTION OF THE DRAWINGS

The system described herein is explained in greater detail below on the basis of the exemplary embodiments illustrated in the figures.

DETAILED DESCRIPTION OF VARIOUS EMBODIMENTS

The same reference numbers in the figures denote the same parts.

Figure 2A:
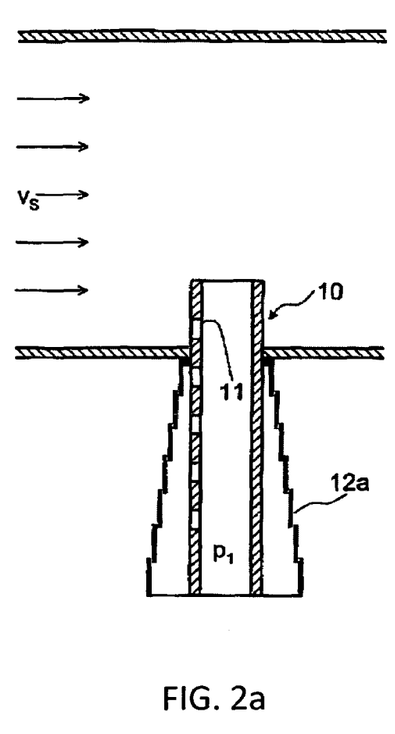
FIG. 2a shows a Pitot tube according to an embodiment of the system described herein having a telescoping tube as a shield.
Figure 2B:
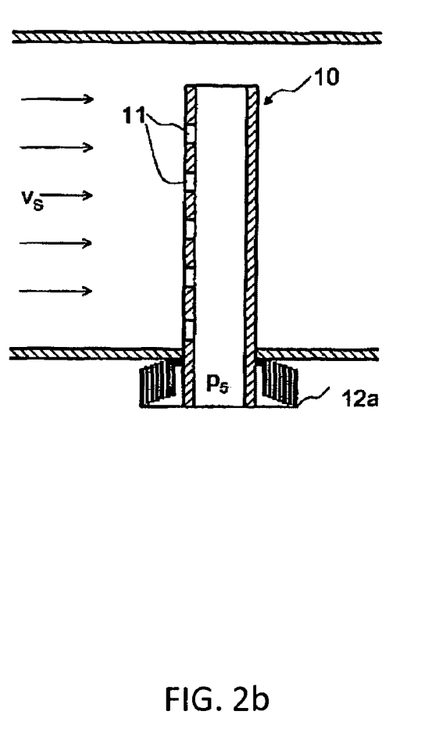
FIG. 2b shows the telescoping tube of FIG. 2a in a retracted position.

FIGS. 2a and 2b show a part of the measuring arrangement according to an embodiment of the system described herein, namely a probe tube 10 having openings 11 positioned along a line parallel to the axis of symmetry on the side facing the flow and having a telescoping tube 12a which is pulled over the probe tube and which is suitable for covering one or more of the successive openings or none at all, depending on the set position and length. Probe tube 11 may be inserted into the channel to different distances, depending on how the length of telescoping tube 12a has been set. FIG. 2a shows the telescoping tube in an extended position, in which all the openings except one in the probe tube have been covered by the telescoping tube. Only a single opening is in the flow channel. Thus, now the one remaining opening in the channel contributes toward the formation of total pressure p1 in the interior of the probe tube. Depending on the position of telescoping tube 12a, any number of openings 11 may now be opened or closed. Only open openings 11, which are therefore freely exposed to oncoming flow, contribute toward the formation of total pressure p1, p2, etc. FIG. 2b shows the telescoping tube in a retracted position, in which it has its shortest length and in which it does not cover any openings 11, so that all openings 11 are in the channel, are freely exposed to oncoming flow and contribute toward the formation of an average total pressure p5 in the interior of probe tube 10. Index "5" with the symbol for total pressure p5 indicates that during the measurement, five openings 11 were exposed to oncoming flow in the probe tube during the measurement.

Figure 3A:
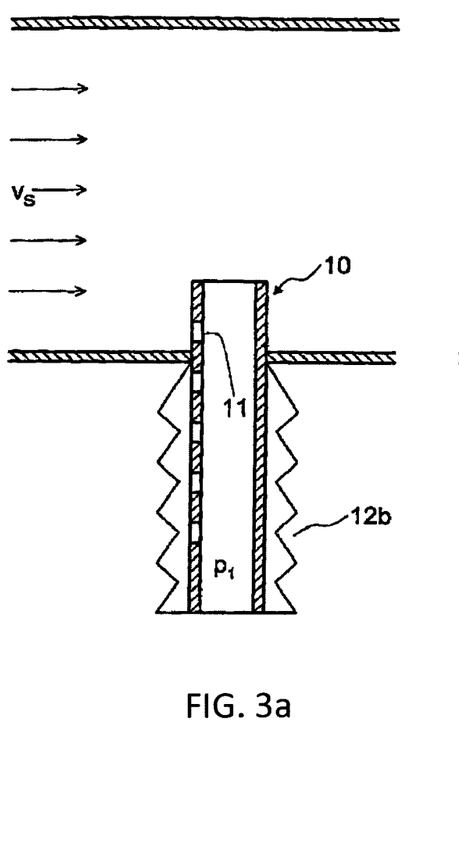
FIG. 3 shows a Pitot tube according to an embodiment of the system described herein having a bellows as a shield.
Figure 3B:
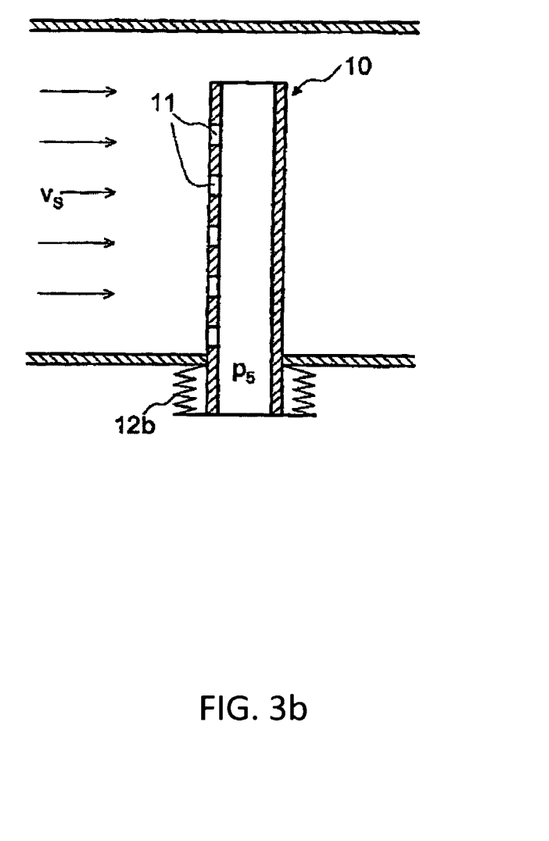

FIGS. 3a and 3b correspond essentially to FIGS. 2a and 2b, but a bellows 12b is used as a shield instead of a telescoping tube 12a. Bellows 12b may become longer by 20 times its minimum length, for example, and is very suitable for covering a variable number of openings 11 in the probe tube and shielding them from the flow.

Figure 4:
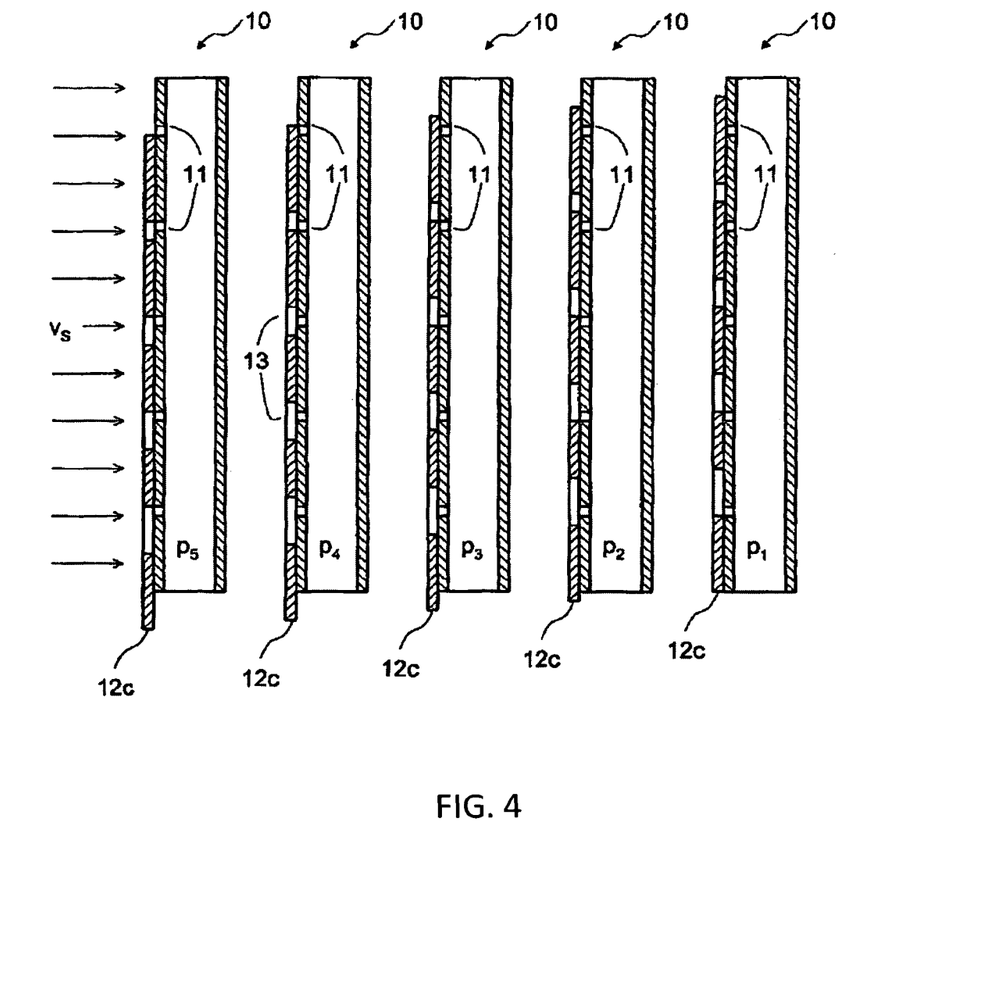
FIG. 4 shows a Pitot tube according to an embodiment of the system described herein having a tube as a shield, which also has openings that overlap with the openings in the probe tube, depending on position.

FIG. 4 shows another embodiment of the probe tube according to the present invention including a shield, which differs from other embodiments in that probe tube 10 is always inserted entirely into the channel when performing a measurement series. In this case, the shield, which is also situated in the channel, is formed by another tube that is pulled over the probe tube. In an alternative embodiment, instead of the additional tube, merely a rail on the side facing away from the flow could be positioned on the probe tube. Additional tube 12c or the rail likewise have openings 13 that are designed and positioned in such a way that, depending on the position of the other tube, either all openings 13 of the additional tube and all openings 11 of the probe tube overlap and are thus freely exposable to the flow, or any number of openings 11 of the probe tube are covered by the additional tube. Depending on the position of additional tube 12c, in this embodiment also one or more successive openings 11 or none at all in the probe tube are covered by additional tube 12c. FIG. 4 shows schematically five different positions of additional tube 12c for a probe tube having five openings 11, so that, depending on the position of additional tube 12c, five, four, three, two or only one single opening 11 in the probe tube is uncovered and may be exposed freely to the oncoming flow. The particular total pressures in the interior of the probe tube correspond to pressures $p_5$ through $p_1$.

Figure 5:
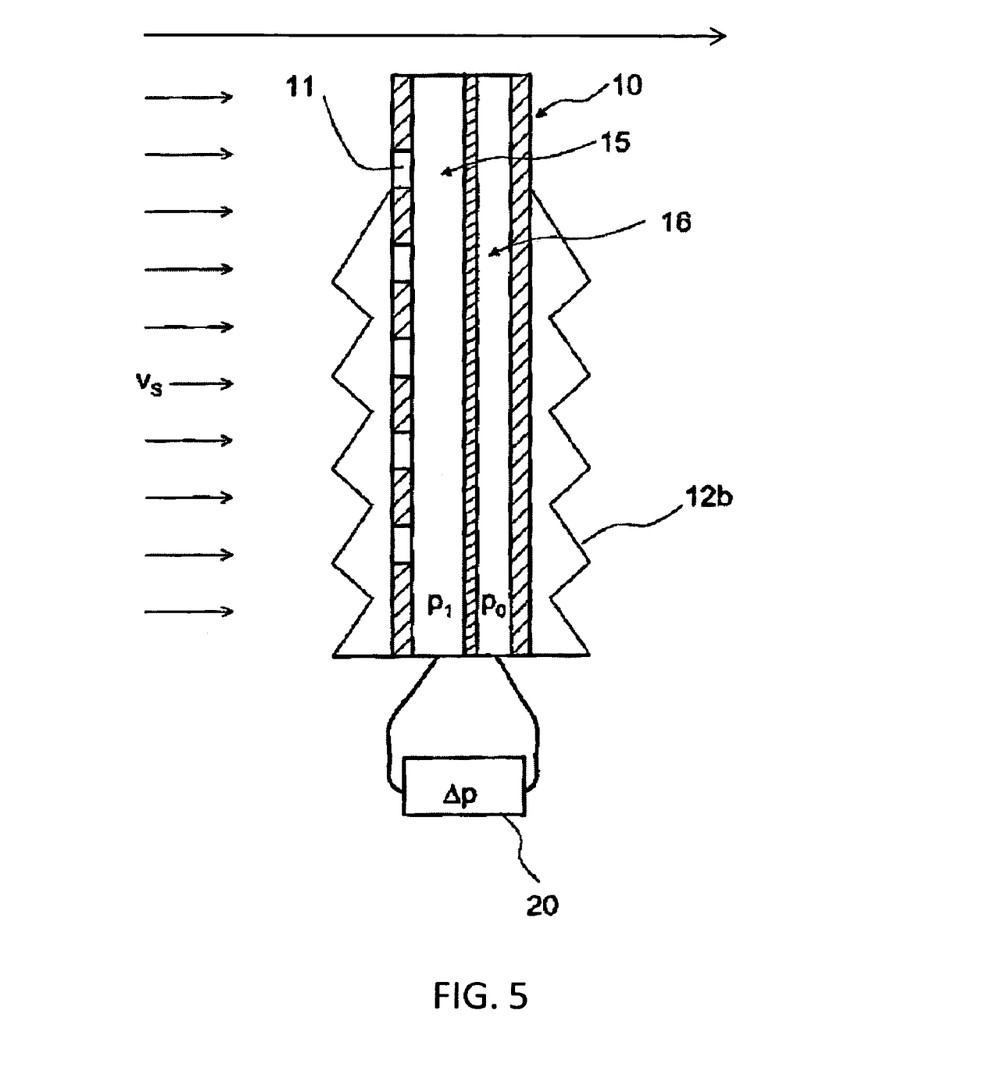
FIG. 5 shows a Pitot tube according to an embodiment of the system described herein similar to that in FIG. 3, but with an interior space divided into two chambers for simultaneous detection of the static pressure.

FIG. 5 again shows the probe tube illustrated in FIG. 3 with a bellows, but the interior of the probe tube in this case has two chambers 15 and 16, all openings 11 leading into a first chamber 15 and a second chamber 16 being connected to the flow channel via only a single opening 14. However, this opening 14 is positioned in such a way that it is not exposed directly to the oncoming flow, i.e., it is parallel to the flow lines, e.g., in the cover surface of a cylindrical probe tube. With a suitable flow, a total pressure p1, p2, etc. will again be established in first chamber 15, calculated from the sum of the flow-dependent dynamic pressure and the static pressure. In second chamber 16, only static pressure p0 will be established, because there is no oncoming flow through opening 14 by which chamber 16 is connected to the flow channel. This arrangement has the advantage that total pressure p1, p2, etc. and static pressure p0 may be measured in the same probe tube and no separate opening in the flow channel is necessary for measurement of static pressure p0 as shown in FIG. 1 for the related art.

Figure 6A:
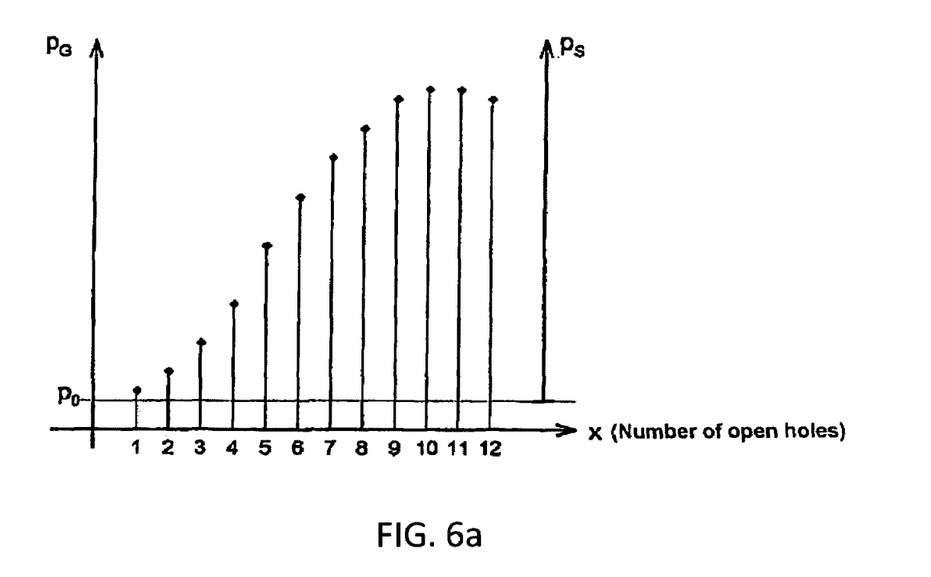
FIG. 6a shows a diagram with a measurement series of the dynamic pressures recorded according to the system described herein as a function of the openings freely exposed to oncoming flow in the probe tube.

FIG. 6a shows as an example (not drawn to scale) the sequence of a measurement series such as that ascertained in the measurement operation according to an embodiment of the system described herein. Using a probe tube that is initially covered completely by the shield, one opening after the other in the probe tube is exposed step by step by manual displacement of the shield or the probe tube (by which the shield is again displaced and/or compressed or elongated) and the dynamic pressure is ascertained as the pressure difference between the total pressure in the interior of the probe tube and the static pressure after exposing the particular opening. In the case of a probe tube having n openings 11, n individual measured values pn are thus obtained in one measurement operation.

Figure 6B:
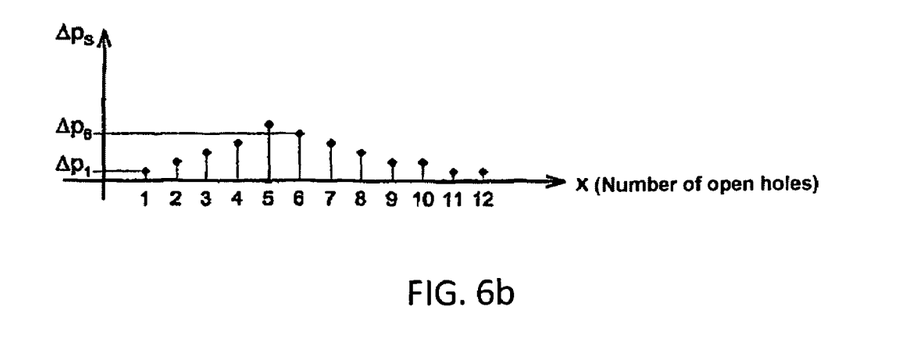
FIG. 6b shows a diagram with the values that were calculated from the measurement series in FIG. 6a and are proportional to the flow profile over the channel cross section.

The shape of the flow profile is easily determined from this measurement series. A series of single-point dynamic pressure values $\Delta p_n$ proportional to the flow profile is obtained by subtracting the product from the dynamic pressure measured instantaneously and the number of openings not covered by the instantaneous measurement from the product of the dynamic pressure measured previously and the number of uncovered openings thereby. Thus if n openings are exposed to oncoming flow in the $n^{th}$ measurement of the measurement series, then the single-point dynamic pressure is $$\Delta p_n = p_n \cdot n - p_{n-1} \cdot (n-1) \text{ for } i>1. \tag{2}$$

In the first measurement with only one opening exposed to oncoming flow in the probe tube, single-point dynamic pressure $\Delta p_1$ is naturally equal to average dynamic pressure $p_1$.

$$\Delta p_1 = p_1 \tag{3}$$

The values being sought for local flow velocity $v_n$, corresponding to single-point dynamic pressure values $\Delta p_n$, are then obtained according to the following equation by analogy with equation (1):

$$v_n = \sqrt{\frac{2 \cdot \Delta p_n}{\rho}}. \tag{4}$$

The local resolution for the flow profile corresponds exactly to the distance between the openings.

An average flow velocity in the flow channel or the volume flow or flow rate is easily calculated from the shape of a flow profile ascertained in this way.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A measuring device for determining flow velocities in a flow channel, comprising:
    a flow channel;
    a probe tube that is inserted through a first aperture into an interior of the flow channel, wherein the probe tube is exposed to a flow having a flow velocity and has multiple openings on a side of the probe tube facing the flow, the openings being interconnected in the interior of the probe tube, wherein a flow velocity-dependent total pressure exists in the interior of the probe tube; and
    a differential pressure sensor that determines a differential pressure between a total pressure in the interior of the probe tube and a static pressure in the flow channel, the probe tube being at least partially surrounded by a shield that is at least one of: displaceable and variable in length and that is adjustable to close at least one of the openings.

2. The measuring device as recited in claim 1, wherein the shield includes a bellows.

3. The measuring device as recited in claim 1, wherein the shield includes a telescoping tube.

4. The measuring device as recited in claim 1, wherein the probe tube is inserted only partially into the interior of the flow channel, and the shield covers the opening outside of the flow channel.

5. The measuring device as recited in claim 1, wherein the shield includes at least one of: a displaceable tube and a displaceable rail having holes positioned in such a way that, starting from a first position of the shield in which the holes overlap with the openings of the probe tube, one opening of the probe tube after the other is closed by the shield during displacement of the shield.

6. The measuring device as recited in claim 1, wherein the differential pressure sensor is connected directly to the channel via a second aperture to detect the static pressure in the flow channel.

7. The measuring device as recited in claim 1, wherein the probe tube has a first chamber which is connected to the flow channel via the openings and exposed to the total pressure, and a second chamber which is connected to the flow channel via an opening on the end face of the probe tube and exposed to the static pressure.

8. The measuring device as recited in claim 7, wherein the differential pressure sensor is connected to the probe tube and measures the difference between the total pressure in the first chamber and the static pressure in the second chamber of the probe tube.

9. A method for measuring a flow profile in a flow channel, comprising:
    inserting a probe tube through a first aperture into an interior of the flow channel, wherein the probe tube is exposed to a flow having a flow velocity and has multiple openings on the side of the probe tube facing the flow, the openings being interconnected in the interior of the probe tube, wherein a flow velocity-dependent total pressure exists in the interior of the probe tube; and
    determining a differential pressure between a total pressure in the interior of the probe tube and a static pressure in the flow channel, the probe tube being at least partially surrounded by a shield that is at least one of: displaceable and variable in length and that is adjustable to close at least one of the openings.

10. The method as recited in claim 9, wherein, starting from a basic state in which only one of the openings of the probe tube is not closed, one opening of the probe tube after the other is exposed by displacement of the shield or the probe tube.

11. The method as recited in one of claim 9, wherein a measurement series of pressure values is recorded, wherein a new measured value for the differential pressure is recorded when an additional opening of the probe tube has been closed or exposed.

12. The method as recited in claim 11, wherein the flow profile is calculated from the measurement series.

13. The method as recited in claim 9, wherein, starting from a basic condition in which all openings of the probe tube are opened, one opening of the probe tube after the other is closed in succession by displacement of a shield.

14. A measuring device for determining flow velocities in a flow channel, comprising:
- a probe tube that is inserted through a first opening into an interior of the flow channel, wherein the probe tube is exposed to a flow having a flow velocity and wherein the probe tube has multiple openings, wherein the openings are interconnected in the interior of the probe tube and wherein a flow velocity-dependent total pressure exists in the interior of the probe tube;
- a differential pressure sensor that determines a differential pressure between a total pressure in the interior of the probe tube and a static pressure in the flow channel; and
- a shield that at least partially surrounds the probe tube, wherein the shield is at least one of: displaceable and variable in length and is adjustable to close at least one of the openings of the probe tube.

15. The measuring device as recited in claim 14, wherein the shield includes at least one of: a bellows and a telescoping tube.

16. The measuring device as recited in claim 14, wherein the probe tube is inserted only partially into the interior of the flow channel, and the shield covers the opening outside of the flow channel.

17. The measuring arrangement device as recited in claim 14, wherein the shield is adjustable such that one opening of the probe tube after the other is closed by the shield during displacement of the shield.

18. The measuring device as recited in claim 14, wherein the differential pressure sensor is coupled to the flow channel via a second aperture to detect the static pressure in the flow channel.

19. The measuring device as recited in claim 14, wherein the probe tube has a first chamber which is coupled to the flow channel via the openings and exposed to a total pressure, and a second chamber which is coupled to the flow channel via an opening on an end face of the probe tube and exposed to the static pressure.

20. The measuring device as recited in claim 19, wherein the differential pressure sensor is coupled to the probe tube and measures the difference between the total pressure in the first chamber and the static pressure in the second chamber of the probe tube.

* * * * *